United States Patent [19]

Bryant et al.

[11] Patent Number: 5,936,021

[45] Date of Patent: Aug. 10, 1999

[54] MASTERBATCH AND RESIN SYSTEMS INCORPORATING SAME

[75] Inventors: Darrel A. Bryant; David J. Kaul, both of Champaign, Ill.

[73] Assignee: Cabot Corporation, Boston, Mass.

[21] Appl. No.: 08/758,020

[22] Filed: Nov. 27, 1996

[51] Int. Cl.$^6$ .............................. C08K 3/18; C08K 3/34; C08K 7/16; C09K 15/32

[52] U.S. Cl. ........................ 524/430; 524/492; 523/223; 523/466; 252/49.7; 252/400.1; 252/400.3; 252/400.52

[58] Field of Search .................... 524/430, 492; 523/223, 466; 252/49.7, 400.3, 400.52, 400.1

[56] References Cited

U.S. PATENT DOCUMENTS

| | | | |
|---|---|---|---|
| 4,122,060 | 10/1978 | Yallourakis | 260/37 |
| 4,320,047 | 3/1982 | Murphy et al. | 523/457 |
| 4,418,166 | 11/1983 | Chesney, Jr. et al. | 523/400 |
| 4,510,276 | 4/1985 | Leech et al. | 523/427 |
| 4,562,217 | 12/1985 | Hirschbuehler | 523/466 |
| 4,578,424 | 3/1986 | Goel | 525/109 |
| 4,591,618 | 5/1986 | Naito et al. | 525/279 |
| 4,661,539 | 4/1987 | Goel | 523/400 |
| 4,675,122 | 6/1987 | Lüers et al. | |
| 4,680,076 | 7/1987 | Bard | 156/306.9 |
| 4,695,605 | 9/1987 | Goel | 525/109 |
| 4,728,384 | 3/1988 | Goel | 156/307.3 |
| 4,728,737 | 3/1988 | Goel | 544/400 |
| 4,739,019 | 4/1988 | Schappert et al. | 525/438 |
| 4,740,539 | 4/1988 | Goel | 523/400 |
| 4,775,728 | 10/1988 | Goel | 525/523 |
| 4,822,683 | 4/1989 | Schappert et al. | 428/414 |
| 4,900,387 | 2/1990 | Johnson | 156/272.2 |
| 4,916,187 | 4/1990 | Goel | 525/109 |
| 4,962,138 | 10/1990 | Kimball | 523/428 |
| 5,001,193 | 3/1991 | Golden | 525/109 |
| 5,039,768 | 8/1991 | Gerace et al. | 526/279 |
| 5,086,088 | 2/1992 | Kitano et al. | 522/170 |
| 5,143,650 | 9/1992 | Gerace et al. | 252/511 |
| 5,194,502 | 3/1993 | Saito et al. | 525/111 |
| 5,204,386 | 4/1993 | Ersun-Hallsby et al. | 523/443 |
| 5,223,106 | 6/1993 | Gerace et al. | 204/181.1 |
| 5,232,996 | 8/1993 | Shah et al. | 525/452 |
| 5,252,694 | 10/1993 | Willett et al. | 525/404 |
| 5,468,831 | 11/1995 | Lenke et al. | 528/44 |

FOREIGN PATENT DOCUMENTS

| | | | |
|---|---|---|---|
| 0 570 978 A1 | 11/1993 | European Pat. Off. | C08L 83/04 |
| WO 96/01875 | 1/1996 | European Pat. Off. | C09C 1/58 |
| 0 778 307 A2 | 6/1997 | European Pat. Off. | C08J 3/22 |
| 37 21 916A1 | 1/1988 | Germany | C08J 3/20 |
| 796 571 | 6/1958 | United Kingdom. | |
| WO 96/21698 | 7/1996 | WIPO | C09C 1/58 |

OTHER PUBLICATIONS

Cabot Corporation Brochure, CAB–O–SIL ® Fumed Silica in Adhesives and Sealants, Jun. 1990.

Cochrane et al., Adhesives Age, "Hydrophobic Fumed Silica as a Rheology Control Agent for Epoxy Adhesives, Sealants," Nov., 1982.

Cochrane et al., Modern Paint and Coatings, "Hydrophobic Fumed Silica Control of Epoxy Rheology" Oct., 1983.

Thomas R. Sweeney, Adhesives Age, "Fumed Silica's Growing Role in Non–Sag Sealants and Adhesives," Jan., 1967.

Dennis G. Miller, Adhesives Age, "Improving Rheology Control of Epoxy Hardeners", May, 1986.

Miller et al., Modern Paint and Coatings, "Rheology Control of High–Solids Coatings," Apr., 1983.

Moll et al., Adhesives Age, "Formulating Adhesives with Fumed Silica," Apr., 1981.

Cabot Corporation Bulletin entitled, "CAB–O–SIL for Stable Thixotropic Epoxies," CPla–3, Apr., 1962.

Cabot Corporation Bulletin entitled, "CAB–O–SIL ® in the Plastics Industry," CPla–2, Jan., 1955, Revised Apr. 1960.

Cabot Corporation Publication, "CAB–O–SIL® TS–720, Treated Fumed Silica", Jan. 1996.

Ayala et al., Part. Chart., "The Relevance of Powder/Liquid Wettability to the Cohesiveness of Carbon Black Agglomerates," 1986.

*Primary Examiner*—Kriellion S. Morgan

[57] ABSTRACT

A free-flowing, powdery masterbatch including a metal oxide, having a material that is absorbed within the intra-aggregate void space of the metal oxide and a resin system incorporating same are disclosed. The material that is absorbed within the intra-aggregate void space of the metal oxide is selected from, but not limited to, organic materials and polyorganosiloxanes (commonly referred to as silicones). The organic materials, whether monomeric, polymeric, or elastomeric, more preferably include, but are not limited to, acrylics, alkyds, epoxies, formaldehydes, glycols, polyamides, polyesters, polyethers, polyimides, polyolefins, polyols, polysulfides, polyvinyl acetate, polyurethanes, silicones, or mixtures thereof. The polyorganosiloxanes may include various functional groups, for example methyl, phenyl, vinyl, trifluoro, chloro and combinations thereof. The metal oxide is selected from the group consisting of silica, alumina, ceria, titania, zirconia and mixtures thereof.

Also disclosed is a method for producing the free-flowing, powdery masterbatch and the resin system incorporating the masterbatch.

26 Claims, 2 Drawing Sheets

MASTERBATCH AND RESIN SYSTEMS INCORPORATING SAME

BACKGROUND OF THE INVENTION

1. Field of the Invention.

The present invention relates to a masterbatch and more particularly, to a free-flowing, powdery masterbatch including a metal oxide, having a material that is absorbed within the intra-aggregate void space of the metal oxide, and a resin system incorporating same.

2. Background of Related Art

Adhesive and sealants are widely used throughout the world in many commercial and industrial applications ranging from textiles and shoes to automotive and aerospace. In general, an adhesive composition is used to bind two substrates together, while a sealant composition is generally used to form a load-bearing elastic joint between two substrates. While there are a wide variety of end item applications for sealants and adhesives, their fundamental purpose is the same, i.e. to adhere to or bind substrates. As a result, there is a fair degree of overlap in the function of adhesive and sealant compositions. A useful adhesive or sealant should exhibit certain performance characteristics, including for example, good flow and handling characteristics, good sag resistant, and good shelf life.

Many adhesives and sealants are derived from a family of materials commonly know as resins. A resin can be a naturally occurring product such as copal, rosin, balsam, or amber, or can be a synthetic product such as a urethane, acrylic, glycol, epoxy, polyester or a polyol. Epoxy resins are commonly used structural adhesives and sealants because of their strength, versatility, and excellent adhesion to a variety of surfaces. Generally, epoxy resin systems are formulated into either one or two-component, ambient or heat-cured paste or films. Typical ingredients added to the epoxy resin systems, depending on the desired end product formulation, include curing agents, catalysts and accelerators, fillers, pigments, reactive diluents, non-reactive diluents, solvents, flexibilizers, and rheology control agents.

Good rheological control is important in resin systems, such as, epoxy resin adhesives and sealants, to allow thinning under shear for easy application and wetting of surfaces while retaining good sag resistance properties, and a uniform dispersion of the formulation ingredients. Common rheological control agents for use in resin systems include, among others, calcium carbonates, clays, cellulosic and natural gums, pulp fibers, and metal oxides, including, alumina, and silica. For example see U.S. Pat. Nos. 4,695,605, 4,320,047, and 4,728,384, the specifications of which are incorporated in their entirety by reference.

Fumed silica is a popular rheology control agent for use in resin based adhesives and sealants. See, for example, Cabot Corporation Technical Data pamphlets entitled "Cab-O-Sil TS-720 Hydrophobic Fumed Silica," and "Cab-O-Sil Funed Silica in Adhesives and Sealants." The use of a fumed silica usually requires more than 5 weight percent of the fumed silica to achieve good rheological control. However, such high concentrations of fumed silica can have detrimental effects on system viscosity.

The mixing of rheology control agents into adhesives or sealants is a known process often resulting in enhanced material properties of the adhesive or sealant itself. However, the incorporation of rheology control agents, for example metal oxides, into an adhesive or sealant is often difficult as many adhesives and sealants are highly viscous materials, and the metal oxides themselves are often a dry, dust like material making many conventional materials handling methods impractical. Because of the characteristics of the products, incorporation often results in incomplete and non-uniform dispersion of the rheology control agent into the adhesive or sealant. To remedy this problem, it has been suggested to prepare a pre-mix of a rheology control agent and a carrier material to form a wet masterbatch material and then incorporate the wet masterbatch into the desired system to form an adhesive or sealant.

A wet masterbatch material may be prepared by starting with a carrier adhesive or sealant material, for example a resin, and adding to that resin a rheology control agent, for example a fumed silica. The fumed silica is generally added in an amount less then about 23% by weight of fumed silica. A wet masterbatch whose composition exceeds 23% by weight of fumed silica often results in an agglomerated material that does not fully disperse when mixed with a base material, such as a resin. See for example, Sweeney, "Fumed Silica's Growing Role in Non-Sag Sealants and Adhesives," Adhesive Age, pp 32–34, (January 1967).

While the use of a wet masterbatch is an improvement over the direct mixing of the fumed silica into a base resin, the wet masterbatch is not without disadvantages including, for example, the difficulties and costs associated with the handling and transfer of the wet masterbatch materials. Since a wet masterbatch is primarily resin, it is a viscous, pasty, and sticky material which makes common handling methods for such material impractical. As a result, more costly methods of handling wet materials must be employed. In addition to the problems associated with handling of the wet masterbatch is the loss of material from adhesion to containment vessels and transfer devices and the costs associated the with cleaning and removal of the residual material from such containers and transfer devices. Accordingly, a need remains for rheology control agents with improved handling characteristics, ease of incorporation and processability.

In addition, a further need remains for improved rheology control agents that will permit a more complete dispersion into adhesive or sealant materials, and in particular a method that would permit a more complete dispersion of a metal oxide rheology control agent into base resin.

SUMMARY OF THE INVENTION

The present invention is directed to a free-flowing, powdery masterbatch which includes a metal oxide having a material absorbed within the intra-aggregate void space of the metal oxide. The weight percent range of the metal oxide used in forming the masterbatch will vary depending on the aggregate structure of the metal oxide utilized. For example, the composition of the masterbatch of the present invention ranges from about 25 weight percent to about 99 weight percent for a fumed or precipitated metal oxide. This range has been found to maximize the loading level of the metal oxide while maintaining good dispersibility and still maintaining the masterbatches free-flowing, powdery characteristic. In a preferred embodiment of the invention, the masterbatch consists of a fumed or precipitated metal oxide content of from about 25 weight percent to about 80 weight percent, by weight, metal oxide. In a more preferred embodiment of the invention, the masterbatch consists of about 30 weight percent to about 75 weight percent, by weight of a fumed or precipitated metal oxide.

The present invention is also directed to a resin system which includes a resin and the free-flowing, powdery, masterbatch described above and is produced by combining these products utilizing conventional mixing techniques. In a preferred embodiment, the resin system consists of about 2 to 4 weight percent by weight of the metal oxide.

The present invention is further directed to a process for preparing a masterbatch which includes adding a material to a metal oxide and mixing said metal oxide and material to absorb such material within the intra-aggregate void space of the metal oxide to form a free flowing, powdery masterbatch.

The masterbatch of the present invention is an improvement over conventional direct mixing or wet masterbatches of the prior art in that preferred metal oxide loading levels can be achieved in resin systems by the use of conventional "dry product" material handling systems rather then specialized systems or manual methods required of wet masterbatches. In addition, being that the masterbatch is free-flowing and powdery, less residual materials remains in transfer and containment vessels, thereby resulting in reduced system maintenance, cleaning and lost product.

DETAILED DESCRIPTION OF THE INVENTION

The present invention is directed to free-flowing, powdery, masterbatch which includes a metal oxide having a material absorbed within the intra-aggregate void space of the metal oxide. By free-flowing is meant that the masterbatch acts like a dry material even though the material, a liquid at the time of processing, is used. In other words, the masterbatch should not contain any "free" liquid in the masterbatch. The masterbatch has been found to provide effective rheology control in resin systems, such as epoxy adhesives and sealants.

The metal oxides of the present invention are selected from the group of silica, alumina, ceria, titania, zirconia and mixtures thereof. The metal oxide may be a hydrophilic or treated, utilizing conventional techniques, with a suitable agent to make it hydrophobic. Preferably, the metal oxide is a fumed or precipitated material or is a gel processed materials including for example, aerogels, silica-gels, xerogels, hydrogels and the like. The metal oxide may be produced utilizing techniques know to those skilled in the art. For example, the production of a fumed metal oxide is a well-documented process which involves the hydrolysis of suitable feed stock vapor (such as aluminum chloride for a fumed alumina, and silicon tetrachloride for fumed silica) in a flame of hydrogen and oxygen. Molten particles of roughly spherical shape are formed in the combustion process, the diameters of which are varied through process parameters. These molten spheres, typically referred to as primary particles, fuse with one another by undergoing collisions at their contact points to form branched, three dimensional chain-like aggregates. This three dimensional structure results in a material exhibiting a random geometry containing several pocketed area otherwise known as intra-aggregate voids. The force necessary to break aggregates is considerable and often considered irreversible because of the fusion. During cooling and collecting, the aggregates undergo further collisions that may result in some mechanical entanglements to form agglomerates. These Agglomerates are thought to be loosely held together by van der Waals forces and can be reversed, i.e. de-agglomerated, by proper dispersion in a suitable media.

Precipitated metal oxides may be manufactured utilizing conventional techniques and are typically formed by the coagulation of the desired particles from an aqueous medium under the influence of high salt concentrations, acids or other coagulants. The particles are filtered, washed, dried and separated from residues of other reaction products by conventional techniques known to those skilled in the art.

The manufacture of gel based materials, e.g. aerogels, xerogels, hydrogels and other gels, is well known to those skilled in the art and may be accomplished utilizing conventional techniques, for example, U.S. Pat. No. 3,652,214 to Aboutboul, et al., U.S. Pat. No. 5,270,027 to Balducci, et al., U.S. Pat. No. 2,188,007 to Kistler, and as disclosed in the article by Heley, et al., entitled "Fine Low Density Silica Powders Prepared by Supercritical Drying of Gels Derived From Silicon Tetrachloride," Journal of Non-Crystalline Solids, 186, 30–36 (1995), the disclosures of which are incorporated herein in their entirety by reference. Similar to that of the fumed metal oxides, the precipitated or gel based metal oxides will also form three-dimensional chain-like structures creating intra-aggregate void spaces.

The size of the primary spherical particles that comprise the metal oxide aggregates determine the surface area. The surface area of the metal oxides may be measured by the nitrogen adsorption method of S. Brunauer, P. H. Emmet, and I. Teller, J. Am. Chemical Society, Volume 60, Page 309 (1938) and is commonly referred to as BET. Typical BET values for metal oxides range from 40 $m^2/g$ to about 1000 $m^2/g$, preferably between 50 $m^2/g$ to about 400 $m^2/g$, and more preferably between 100 $m^2/g$ to about 250 $m^2/g$. The spaces between the primary particles form what is known as the intra-aggregate voids. These voids create what is known as pore volume or void volume. Although many commercially available metal oxides are suitable, CAB-0-SILO® fumed silica, available from the Cab-O-Sil Division of Cabot Corporation, Tuscola, Ill., is preferred.

The material absorbed within the intra-aggregate void space of the metal oxide of the present invention includes a wide range of commercially available natural and synthetic products and is selected from, but not limited to, organic materials and polyorganosiloxanes (commonly referred to as silicones). The material utilized should be compatible with the particular resin system into which it will be ultimately be incorporated and is in a liquid form during processing, i.e. when incorporated into the metal oxide. The organic materials, whether monomeric, polymeric, or elastomeric more preferably include, but are not limited to, acrylics, alkyds, epoxies, formaldehydes, glycols, polyamides, polyesters, polyethers, polyimides, polyolefins, polyols, polysulfides, polyvinyl acetate, polyurethanes, and mixtures thereof, all of which are commercially available and are produced utilizing techniques known to those skilled in the art. The polyorganosiloxanes may include various functional groups, for example methyl, phenyl, vinyl, trifluoro, chloro and combinations thereof. Common polyorganosiloxanes include polydimethylsiloxanes, dimethylphenylmethylpolysiloxane or trifluoropropylmethylsiloxane. In addition the polyorganosiloxanes may be of a branched, cyclic, linear, or oligomeric nature and contain various functionalities including, for example: alkenyl groups; halo groups; hydroxy groups; carboxy groups; cyano groups;

epoxy groups; amino groups; and combinations thereof. Examples of such resins are sold under a variety of trademarks including D.E.R.® Epoxy Resin, Drakeol® Mineral Oil, Polylite® Alkyd Resin, Epone® Epoxy Resin, and DC200® Silicone Oil.

Figure 1:
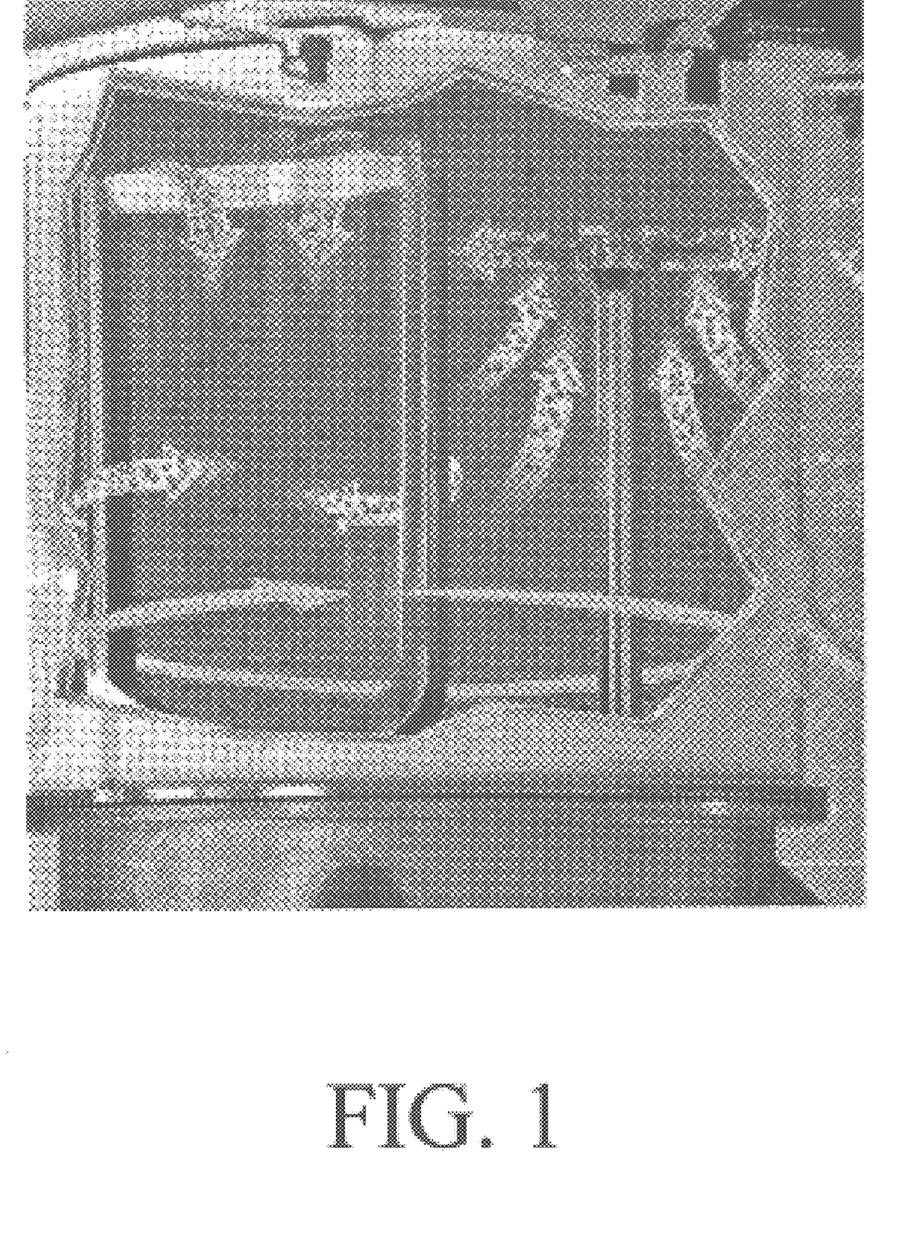
FIG. 1 is an illustration of mixing equipment which includes a low speed planetary blade and a high speed dispersal blade, in accordance with one embodiment of the present invention.
Figure 2:
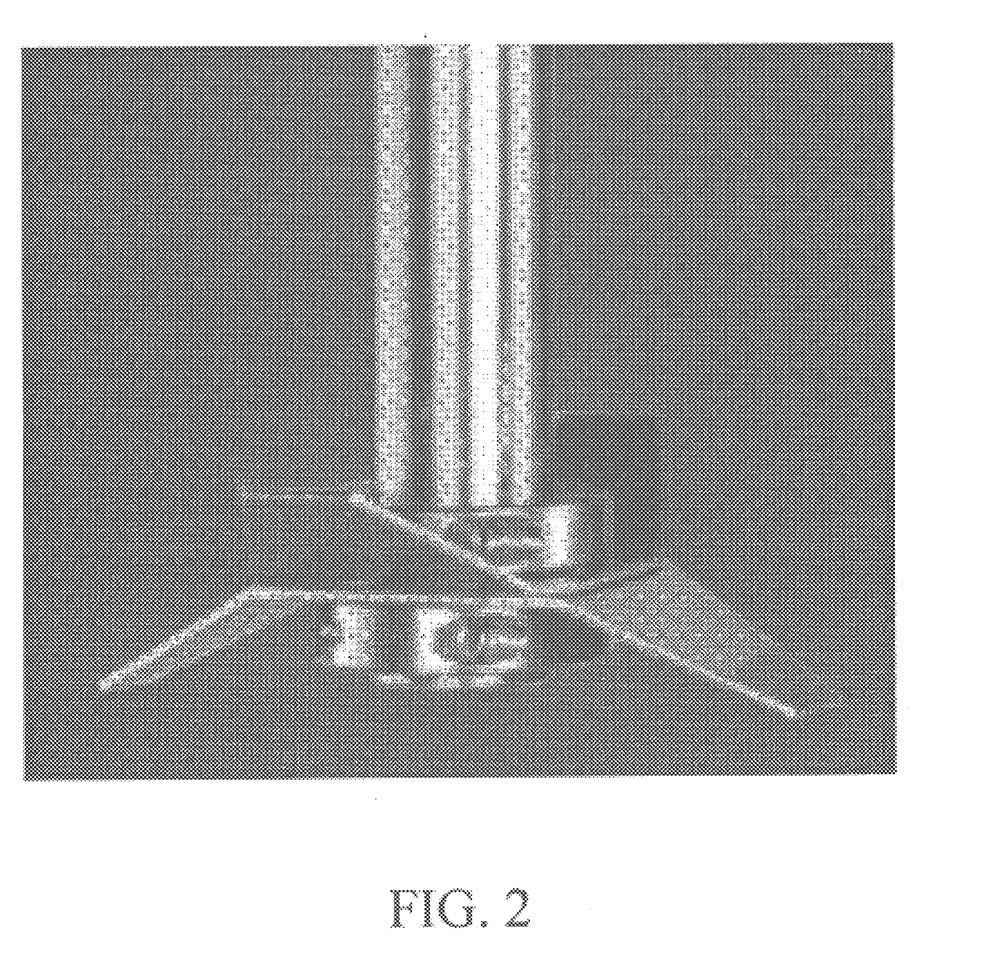
FIG. 2 is an illustration of a high speed, chopper mixing blade, in accordance with another embodiment of the present invention.

The free-flowing masterbatch of the present invention is prepared by combining or mixing the material to be absorbed within the intra-aggregate void space of the metal oxide into the metal oxide. The two components are mixed, in the appropriate weights amounts for a period sufficient to permit the material to be absorbed within the intra-aggregate void spaces of the metal oxide. While a wide variety of conventional techniques are known by those skilled in the art, it is preferred that such mixing take place under high shear conditions utilizing for example, a blender in a batch cycle or a pin pelletizer in a continuous cycle. In a preferred embodiment, a resin is incorporated into the metal oxide using a combined mixing device which incorporates a planetary blade and a high speed dispersal blade, as depicted in FIG. 1. In a more preferred embodiment of the invention, the high speed dispersal blade is of a chopper blade design as depicted in FIG. 2.

The metal oxide content of the masterbatch composition will vary according to the aggregate structure and void volume of the metal oxide utilized. For example, weight percent of a fumed or precipitated metal oxide utilized to formulate the masterbatch of the present invention from about 25 weight percent to about 99 weight percent of metal oxide has been found to maximize the loading level of the metal oxide while maintaining good dispersion and the free-flowing, powdery characteristics of the masterbatch. In a preferred embodiment of the invention, the masterbatch consists of a fumed or precipitated metal oxide content of from about 25 weight percent to about 80 weight percent, by weight, metal oxide. In a more preferred embodiment of the invention, the masterbatch consists of about 30 weight percent to about 75 weight percent, by weight of a fumed or precipitated metal oxide. It is further expected that a lower loading level of the metal oxide may be achieved from a gel processed material, e.g. aerogel, while still possessing the free-flowing, powdery characteristics described herein.

The masterbatch of the present invention may be distinguished from a wet masterbatch by the fact that it is formed on the "dry" side of the capillary state, as opposed to the "wet" side for a wet masterbatch. The expression "dry" side and "wet" side of the capillary state are used solely to indicate whether the metal oxide or the masterbatch contains air within the voids (i.e. "dry") or is air-free within the voids (i.e. "wet"). The volume of material in its liquid state which may be absorbed into the intra-aggregate voids of the metal oxide may be expressed and distinguished at several states of successively increasing liquid levels. When a liquid is mixed into a powder the liquid is present in either a mobile phase or an immobile adsorbed layer. The successive states that a mobile liquid takes may be described as pendular, funicular, and capillary state. See Ayala, et al., "The Relevance of Powder/Liquid Wettability to the Cohesiveness of Carbon Black Agglomerates," Part. Charact., 3, 26–31 (1986) the disclosure of which is incorporated herein in its entirety by reference. In the pendular state, the void spaces in the powder are partially filled with the liquid resulting in the formation of bridges between adjacent primary particles. As more liquid is added to the powder, the liquid coalesces to form a continuous liquid network between the primary particles interdispersed with pockets of air, this is know as the funicular state. The funicular state exists until a point at which the total volume of liquid present is sufficient to just completely fill the entire void space of the powder such that no air remains. This point is known as the capillary state. Beyond the capillary state, the system becomes a slurry. Since the intra-aggregate void spaces are smaller then spaces formed between the metal oxide aggregates, the intra-aggregate void spaces are filled first by the liquid. Only as the intra-aggregate void spaces are filled and the capillary state is reached, can a large number of cohesive, inter-aggregate pendular bonds be formed. The cohesive force, provided by a liquid which wets the powder increases with the increasing liquid level and attains its maximum value at the capillary state. Beyond the capillary state, there is a rapid diminution in cohesivity with small increases in liquid level. In the present invention, because the masterbatch is formed on the "dry" side of the capillary state (i.e. between the pendular and capillary states), the loading level of the metal oxide is greater than that which can be typically achieved in conventional wet masterbatches while maintaining its powdery, free-flowing characteristics. On the other hand, wet masterbatches of the prior art start and remain in a slurry state with the liquid amount exceeding that required to achieve the capillary state. In the wet masterbatch, the intra-aggregate void spaces are completely filled with the liquid and excess liquid is present between the aggregates.

The masterbatch of the present invention can be utilized as a fine powdery material as described above or may be reshaped or reformed in a flake, pellet, or similar form as long as it retains its free-flowing and easily dispersible characteristics.

The present invention is further directed to a resin system which includes a resin and the free-flowing, powdery masterbatch described above. The resin of the present invention is selected from, but not limited to, the same classes of organic materials and silicones used in forming the masterbatches. The organic materials preferably include, but are not limited to, acrylics, alkyds, epoxies, formaldehydes, glycols, polyamides, polyesters, polyethers, polyimides, polyolefins, polyols, polysulfides, polyvinyl acetate, polyurethanes, and mixtures and monomers thereof, all of which are commercially available and are produced utilizing techniques known to those skilled in the art. The resin system of the present invention is prepared by combining or mixing the free-flowing, powdery masterbatch described above with the resin. The two components are mixed, utilizing conventional techniques, in the appropriate weights amounts to achieve the desired loading levels in the end product, for a period sufficient to permit dispersion of the masterbatch throughout the resin.

It is theorized that a mixing of a metal oxide directly with a resin results in a partial wetting of the surface of the metal oxide leaving many of the metal oxides intra-aggregate voids unfilled. As the combined metal oxide/resin material ages, the resin begins to permeate into the empty intra-aggregate voids resulting in a decrease in the materials physical properties. However, it is theorized that the preparation of the masterbatch of the present invention results in many of the metal oxides intra-aggregate voids being filled prior to the incorporation of the masterbatch into the resin, such as an adhesive or sealant material. Thus as the combined masterbatch/resin material ages there is far less resin migration resulting in a more stable material with less decrease in its physical properties.

Typically, resin systems of the present invention contain between 0.5 weight percent to about 5 weight percent of metal oxide. In a preferred embodiment, the resin system consists of a metal oxide content ranging from about 2 weight percent to about 4 weight percent metal oxide. In a more preferred embodiment, the resin system consists of a metal oxide content of from about 2.5 weight percent to about 3.5 weight percent metal oxide.

In summary, the present invention is directed to a free-flowing, powdery masterbatch and a resin system incorporating same. The masterbatch provides improved ease of incorporation into a resin system while minimizing dusting and avoiding costly special handling or processing equipment or techniques. In addition, the masterbatch itself exhibits greater material stability over time and provides uniform dispersion of the metal oxide in the resin, thus promoting improved stability and viscosity control in the resin system.

The present invention will be further illustrated by the following examples, which are intended to be illustrative in nature and are not to be considered as limiting the scope of the invention.

EXAMPLE 1

PREPARATION OF A MASTERBATCH

Eleven free-flowing, powdery masterbatches of various concentrations of the present invention were prepared by incorporating a resin into a metal oxide utilizing a standard Waring blender. The resin utilized was DER 331 epoxy resin (available from Dow Chemical, Midland, Mich.), and the metal oxide utilized was a polydimethylsiloxane PDMS) treated fumed silica having a BET surface area of 130 $M^2/g$ (available from Cabot Corporation, Tuscola, Ill.). The PDMS treated fumed silica was first added to the blender. The epoxy resin was then incorporated into the blender at the desired loading level to form the masterbatch. The masterbatch was stirred at about 3000 rpm for a period of about five minutes. The entire process took place at standard room temperature and pressure. The concentrations of the masterbatch are listed in Table 1.

TABLE 1

| Sample Numbers | 1 | 2 | 3 | 4 | 5 | 6 | 7 | 8 | 9 | 10 | 11 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Silica | 25 | 28 | 35 | 50 | 70 | 80 | 85 | 90 | 95 | 97 | 99 |

The resulting masterbatches in Samples 1 through 11 were all free-flowing, powdery materials. The masterbatches were easy to handle and had minimal or no dusting.

EXAMPLE 2

PREPARATION OF A MASTERBATCH

Eleven free-flowing, powdery masterbatches of various concentrations were prepared by repeating the procedure outline in Example 1, except the metal oxide utilized was a precipitated silica having a BET surface area of 190 $m^2/g$ (available from Degussa AG, Germany). The various concentrations of the masterbatches are listed in Table 2.

TABLE 2

| Sample Numbers | 12 | 13 | 14 | 15 | 16 | 17 | 18 | 19 | 20 | 21 | 22 |
|---|---|---|---|---|---|---|---|---|---|---|---|
| Wt % Resin | 75 | 72 | 65 | 50 | 30 | 20 | 15 | 10 | 5 | 3 | 1 |
| Wt % Precipitated Silica | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 3

PREPARATION OF A MASTERBATCH

Eleven free-flowing, powdery masterbatches of various concentrations were prepared by repeating the procedure outline in Example 1, except the metal oxide utilized was a fumed alumina, having a BET surface area of 50 $m^2/g$, (available from Cabot Corporation, Tuscola, Ill.). The various concentrations of the masterbatches are listed in Table 3.

TABLE 3

| Sample Numbers | 23 | 24 | 25 | 26 | 27 | 28 | 29 | 30 | 31 | 32 | 33 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Alumina | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 4

PREPARATION OF A MASTERBATCH

Eleven free-flowing, powdery masterbatches of various concentrations were prepared by repeating the procedure outline in Example 1, except the metal oxide utilized was a fumed alumina, having a BET surface area of 100 $m^2/g$, (available from Cabot Corporation, Tuscola, Ill.). The various concentrations of the masterbatches are listed in Table 4.

TABLE 4

| Sample Numbers | 34 | 35 | 36 | 37 | 38 | 39 | 40 | 41 | 42 | 43 | 44 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Alumina | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 5

PREPARATION OF A MASTERBATCH

Eleven free-flowing, powdery masterbatches of various concentrations were prepared by repeating the procedure outline in Example 1, except the metal oxide utilized was fumed silica having a BET surface area of 130 $m^2/g$ (available from Cabot Corporation, Tuscola, Ill.) and the resin was L-45/1000 Polydimethylsiloxane (available from Union Carbide, Danbury, Conn.). The various concentrations of the masterbatches are listed in Table 5.

TABLE 5

| Sample Numbers | 45 | 46 | 47 | 48 | 49 | 50 | 51 | 52 | 53 | 54 | 55 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Silica | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 6

PREPARATION OF A MASTERBATCH

Eleven free-flowing, powdery masterbatches of various concentrations were prepared by repeating the procedure outline in Example 1, except the metal oxide utilized was fumed alumina having a BET surface area of 50 m²/g (available from Cabot Corporation, Tuscola, Ill.) and the resin was L-45/1000 Polydimethylsiloxane (available from Union Carbide, Danbury, Conn.). The various concentrations of the masterbatches are listed in Table 6.

TABLE 6

| Sample Numbers | 56 | 57 | 58 | 59 | 60 | 61 | 62 | 63 | 64 | 65 | 66 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Alumina | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 7

PREPARATION OF A MASTERBATCH

Eleven free-flowing, powdery masterbatches of various concentrations were prepared by repeating the procedure outline in Example 1, except the metal oxide utilized was fumed alumina having a BET surface area of 100 m²/g (available from Cabot Corporation, Tuscola, Ill.) and the resin was L-45/1000 Polydimethylsiloxane (available from Union Carbide, Danbury, Conn.). The various concentrations of the masterbatches are listed in Table 7.

TABLE 7

| Sample Numbers | 67 | 68 | 69 | 70 | 71 | 72 | 73 | 74 | 75 | 76 | 77 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Alumina | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 8

PREPARATION OF A MASTERBATCH

Eleven free-flowing, powdery masterbatches of various concentrations were prepared by repeating the procedure outline in Example 1, except the metal oxide utilized was a hydrophilic fumed silica having a BET surface area of 200 m²/g (available from Cabot Corporation, Tuscola, Ill.) and the resin was replaced with a Penreco Drakeol 35 mineral oil (available from Penreco, Butler, Pa.). The various concentrations of the masterbatches are listed in Table 8.

TABLE 8

| Sample Numbers | 78 | 79 | 80 | 81 | 82 | 83 | 84 | 85 | 86 | 87 | 88 |
|---|---|---|---|---|---|---|---|---|---|---|---|
| Wt % Mineral Oil | 75 | 72 | 65 | 50 | 30 | 20 | 15 | 10 | 5 | 3 | 1 |
| Wt % Fumed Silica | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 9

PREPARATION OF A MASTERBATCH

Eleven free-flowing, powdery masterbatches of various concentrations were prepared by repeating the procedure outline in Example 1, except the metal oxide utilized was hydrophilic fumed silica having a BET surface area of 130 m²/g (available from Cabot Corporation, Tuscola, Ill.) and the resin was Polylite 33-131-00, a 60/40, by weight, polyester styrene resin blend (available from Reichhold Chemicals, Inc. Pensacola, Fla.). The various concentrations of the masterbatches are listed in Table 9.

TABLE 9

| Sample Numbers | 89 | 90 | 91 | 92 | 93 | 94 | 95 | 96 | 97 | 98 | 99 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Silica | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 10

PREPARATION OF A MASTERBATCH

Eleven free-flowing, powdery masterbatches of various concentrations were prepared by repeating the procedure outline in Example 1, except the resin was Epon Resin 815, an 86.5/13.5, by weight, bisphenol A/epichlorohyrin n-butyl glycidyl ether blend (available from Shell Chemical Co. Houston, Tex.). The various concentrations of the masterbatches are listed in Table 10.

TABLE 10

| Sample Numbers | 100 | 101 | 102 | 103 | 104 | 105 | 106 | 107 | 108 | 109 | 110 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Silica | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 11

PREPARATION OF A MASTERBATCH

Eleven free-flowing, powdery masterbatches of various concentrations of the present invention were prepared by incorporating a resin into a metal oxide. The resin utilized was DER 331 epoxy resin (available from Dow Chemical, Midland, Mich.), and the metal oxide utilized was a PDMS treated fumed silica having a BET surface area of 130 m²/g (available from Cabot Corporation, Tuscola, Ill.). The PDMS treated fumed silica was first added to a mixing tank utilizing two mixing elements, a planetary blade and a high speed dispersal blade of a chopper blade design, as shown in FIG. 1. The epoxy resin was slowly added to the tank until the desired ratio of fumed silica to epoxy resin was achieved. The planetary blade was operated at 26 rpm while the chopper blade was operated at 1850 rpm for approximately 25 minutes. The entire process took place at standard room temperature and pressure. The various concentrations of the masterbatches are listed in Table 11.

TABLE 11

| Sample Numbers | 111 | 112 | 113 | 114 | 115 | 116 | 117 | 118 | 119 | 120 | 121 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Silica | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 12

PREPARATION OF A MASTERBATCH

Eleven free-flowing, powdery masterbatches of various concentrations were prepared by repeating the procedure outline in Example 11, except the resin was L-45/1000 Polydimethylsiloxane (available from Union Carbide, Danbury, Conn.). The various concentrations of the masterbatches are listed in Table 12.

TABLE 12

| Sample Numbers | 122 | 123 | 124 | 125 | 126 | 127 | 128 | 129 | 130 | 131 | 132 |
|---|---|---|---|---|---|---|---|---|---|---|---|
| Wt % Resin | 75 | 72 | 65 | 50 | 30 | 20 | 15 | 10 | 5 | 3 | 1 |
| Wt % Fumed Silica | 25 | 28 | 35 | 50 | 70 | 80 | 85 | 90 | 95 | 97 | 99 |

The resulting masterbatches were all free-flowing, powdery materials. The masterbatches were easy to handle and had minimal or no dusting.

EXAMPLE 13

PREPARATION OF A RESIN SYSTEM

Samples of a structural epoxy adhesive were prepared by mixing for approximately 5 minutes the free-flowing, powdery masterbatches of Example 1 into a base resin, in this case DER 331 epoxy resin (available from Dow Chemical, Midland, Mich.), using a Waring blender at approximately 3000 rpm. During the process, the masterbatches were "let down" in the resin until the final loading level of the metal oxide, in this case the PDMS treated fumed silica (available from Cabot Corporation, Tuscola, Ill.), was 3% by weight. For comparative purposes, Sample 1 was used as a control and also contained 3% by weight loading level of the PDMS treated fumed silica mixed directly into the same DER 331 epoxy resin. The silica was incorporated using conventional techniques, i.e. without the masterbatch of the present invention. The viscosity of these samples were determined by a Brookfield LVT viscosity meter. Viscosity measurements were determined from 4 hours to 8 weeks using a No. 7 spindle at 5 and 50 rpm, 24° C., and are illustrated in Table 13. Sag values were determined for the samples aged from 24 hours to 4 weeks by a Lenata Anti-Sag Meter, in accordance with ASTM D4400. The results are displayed in Table 14.

TABLE 13

| | Incorp (m:s) | | Viscosity @ 5 and 50 rpm (cps) at Aging Time (Hours) | | | | | | | | | |
|---|---|---|---|---|---|---|---|---|---|---|---|---|
| Sample # | Time | rpm | 4 | 24 | 168 | 336 | 504 | 672 | 840 | 1008 | 1176 | 1344 |
| Control | 15.0 | 5 | 129600 | 132800 | 114400 | 113600 | 108200 | 108000 | — | 88800 | 89600 | 81600 |
| | | 50 | 48180 | 50690 | 41150 | 44550 | 43280 | 44630 | — | 38100 | 38450 | 32130 |
| 11 | 11.8 | 5 | 125600 | 128800 | 120000 | 113600 | 106400 | 95200 | 95200 | 90400 | 84800 | 91200 |
| | | 50 | 42480 | 44320 | 42960 | 42240 | 39200 | 35760 | 36400 | 33760 | 34560 | 34480 |

TABLE 13-continued

| Sample # | Incorp (m:s) Time | rpm | Viscosity @ 5 and 50 rpm (cps) at Aging Time (Hours) | | | | | | | | | |
|---|---|---|---|---|---|---|---|---|---|---|---|---|
| | | | 4 | 24 | 168 | 336 | 504 | 672 | 840 | 1008 | 1176 | 1344 |
| 10 | 10.9 | 5 | 130400 | 132000 | 119200 | 114400 | 102400 | 94400 | 96800 | 90400 | 84800 | 91200 |
| | | 50 | 43040 | 44720 | 42560 | 42400 | 37440 | 35760 | 36320 | 34400 | 32720 | 34800 |
| 9 | 9.3 | 5 | 125600 | 123200 | 122400 | 115200 | 104800 | 94400 | 97600 | 93600 | 85600 | 89600 |
| | | 50 | 42160 | 432004 | 43680 | 42640 | 38800 | 35600 | 36720 | 35280 | 33920 | 35120 |
| 8 | 9.9 | 5 | 120800 | 124800 | 117600 | 108000 | 103200 | 94400 | 95200 | 91200 | 88000 | 88800 |
| | | 50 | 41600 | 43680 | 42320 | 41520 | 38960 | 35520 | 36160 | 33840 | 34160 | 35600 |
| 7 | 7.9 | 5 | 127200 | 126400 | 116800 | 110400 | 101600 | 92000 | 93600 | 89600 | 83200 | 85600 |
| | | 50 | 42640 | 44320 | 42400 | 41920 | 38640 | 35120 | 36400 | 34450 | 33120 | 34720 |
| 6 | 6.4 | 5 | 111200 | 120000 | 111200 | 105600 | 93600 | 90400 | 87200 | 84800 | 79200 | 83200 |
| | | 50 | 41120 | 42800 | 41920 | 42160 | 39200 | 34960 | 350403 | 34080 | 32320 | 33920 |
| 5 | 2.3 | 5 | 109600 | 119200 | 110400 | 108000 | 100000 | 88000 | 88000 | 86400 | 80800 | 82400 |
| | | 50 | 40320 | 42080 | 41680 | 42000 | 39600 | 34880 | 35680 | 34800 | 33440 | 33840 |
| 4 | 1.0 | 5 | 89600 | 92800 | 87200 | 84800 | 79200 | 69600 | 69600 | 66400 | 62400 | 64800 |
| | | 50 | 34960 | 36720 | 366403 | 36900 | 34880 | 30800 | 31600 | 29920 | 28960 | 28400 |
| 3 | 0.4 | 5 | 61600 | 64000 | 64000 | 62400 | 59200 | 51200 | 50400 | 48000 | 44800 | 44800 |
| | | 50 | 28960 | 29920 | 31120 | 36080 | 30640 | 26480 | 27280 | 25680 | 24880 | 25840 |
| 2 | 0.3 | 5 | 51200 | 54400 | 55200 | 55200 | 48800 | 43200 | 43200 | 40800 | 38400 | 39200 |
| | | 50 | 27280 | 29680 | 30160 | 30640 | 29200 | 26240 | 26560 | 24240 | 24400 | 24880 |
| 1 | 0.2 | 5 | 60800 | 67200 | 68000 | 64800 | 62400 | 56800 | 53600 | 52800 | 48800 | 49600 |
| | | 50 | 29840 | 32720 | 33520 | 32960 | 31920 | 30000 | 29520 | 30480 | 27680 | 28320 |

TABLE 14

| Sample# | Sag (Mils) at Aging Time (Hours) | | | | |
|---|---|---|---|---|---|
| | 24 | 168 | 336 | 504 | 672 |
| Control | 110+ | 110+ | 110+ | 110+ | 110+ |
| 11 | 110+ | 110+ | 110+ | 110+ | 110+ |
| 10 | 110+ | 110+ | 110+ | 110+ | 110+ |
| 9 | 110+ | 110+ | 110+ | 110+ | 110+ |
| 8 | 110+ | 110+ | 110+ | 110+ | 110+ |
| 7 | 110+ | 110+ | 110+ | 110+ | 110+ |
| 6 | 110+ | 110+ | 110+ | 110+ | 110+ |
| 5 | 110+ | 110+ | 110+ | 110+ | 110+ |
| 4 | 85 | 85 | 80 | 80 | 70 |
| 3 | 35 | 35 | 16 | 15 | 16 |
| 2 | 14 | 14 | 16 | 14 | 12 |
| 1 | 16 | 16 | 18 | 18 | 16 |

A review of Tables 13 and 14 shows that the free-flowing, powdery masterbatch of the present invention, when mixed with a resin to form a resin system, results in a material whose physical properties are substantially equivalent to those of the control. It will be understood by those skilled in the art that each particular masterbatch, depending on the particular metal oxide and resin system, will need to be optimized in order to balance the trade off between incorporation time and performance. For example, the masterbatch of samples of 5–11 are preferred due to their ease of incorporation, improved incorporation time and good performance characteristics of the adhesive. As a result, the free-flowing, powdery masterbatch of the present invention provides substantially equivalent performance characteristics as the non-masterbatched metal oxides without the materials handling problems associated with non-masterbatched or wet masterbatch materials.

EXAMPLE 14

PREPARATION OF A RESIN SYSTEM

Samples of a structural epoxy adhesive were prepared by repeating the steps outline in Example 13 except that the masterbatch of Example 1 was first aged at 60° C. for one week prior to incorporation into the base resin and let-down to the 3% loading level. Viscosity measurements were determined from 4 hours to 8 weeks using a No. 7 spindle at 5 and 50 rpm, 24° C., and are illustrated in Table 15. Sag values were determined for the samples aged from 24 hours to 4 weeks by a Lenata Anti-Sag Meter and are displayed in Table 16.

TABLE 15

| Sample Number | rpm | Viscosity @ 5 & 50 rpm (cps) at Aging Time (Hours) | | | | | |
|---|---|---|---|---|---|---|---|
| | | 4 | 24 | 168 | 336 | 504 | 672 |
| 10 | 5 rpm | 115200 | 112800 | 100800 | 85600 | 84800 | 82400 |
| | 50 rpm | 41600 | 42000 | 32920 | 32720 | 34160 | 32560 |
| 8 | 5 rpm | 116800 | 120800 | 100800 | 88800 | 89600 | 86400 |
| | 50 rpm | 42240 | 43680 | 38720 | 33440 | 35440 | 33760 |
| 5 | 5 rpm | 101600 | 100000 | 89600 | 77600 | 80000 | 76800 |
| | 50 rpm | 38720 | 38880 | 36960 | 31680 | 34080 | 31680 |
| 3 | 5 rpm | 49600 | 48800 | 48800 | 40800 | 39200 | 36800 |
| | 50 rpm | 27040 | 26720 | 27200 | 23040 | 23760 | 22480 |

TABLE 16

| Sample Number | Sag (Mils) at Aging Time (Hours) | | | | | |
|---|---|---|---|---|---|---|
| | 4 | 24 | 168 | 336 | 504 | 672 |
| 11 | — | 110+ | 110+ | 110+ | 110+ | 110+ |
| 8 | — | 110+ | 110+ | 110+ | 110+ | 110+ |
| 5 | — | 110+ | 110+ | 110+ | 100 | 100 |
| 3 | — | 40 | 35 | 16 | 16 | 14 |

A review of Tables 15 and 16 shows that the aged free-flowing, powdery masterbatch of the present invention when mixed with a resin, to form a resin system, results in a material whose physical properties are substantially equivalent to that of the equivalently aged control. As noted above, it will be understood by those skilled in the art that each particular masterbatch, depending on the particular metal oxide and resin system, will need to be optimized in order to balance the trade off between incorporation time and performance. For example, the masterbatch of samples of 5, 8 and 11 are preferred due to their ease of incorporation, improved incorporation time and good performance characteristics of the adhesive. As a result, the aged free-flowing, powdery masterbatch of the present invention provides substantially equivalent performance characteristics as the aged non-masterbatched metal oxides but without the materials handling problems associated with the non-masterbatched or the wet masterbatch materials.

EXAMPLE 15

PREPARATION OF A RESIN SYSTEM

Samples of a structural epoxy adhesive were prepared by repeating the steps outline in Example 13 except the masterbatch of Example 1 was aged for four weeks at 60° C. prior to incorporation into the base resin and let-down to the 3% loading level. Viscosity measurements were determined from 4 hours to 8 weeks using a No. 7 spindle at 5 and 50 rpm, 24° C., and are illustrated in Table 17. Sag values were determined for the samples aged from 24 hours to 4 weeks by a Lenata Anti-Sag Meter and are displayed in Table 18.

TABLE 17

| Sample Number | rpm | Viscosity @ 5 & 50 rpm(cps) at Aging Time (Hours) | | | | | |
|---|---|---|---|---|---|---|---|
| | | 4 | 24 | 168 | 336 | 504 | 672 |
| 11 | 5 rpm | 115200 | 111200 | 97600 | 91200 | 89600 | 85600 |
| | 50 rpm | 41360 | 39360 | 35760 | 34400 | 34480 | 33680 |
| 8 | 5 rpm | 112800 | 88000 | 94400 | 89600 | 85600 | 82400 |
| | 50 rpm | 41360 | 32480 | 34640 | 34080 | 33840 | 33200 |
| 5 | 5 rpm | 92000 | 85600 | 76000 | 61600 | 70400 | 66400 |
| | 50 rpm | 36080 | 33840 | 31040 | 26880 | 30800 | 29680 |
| 3 | 5 rpm | 37600 | 36000 | 33600 | 32800 | 31200 | 32800 |
| | 50 rpm | 23360 | 22240 | 20640 | 21280 | 21040 | 22240 |

TABLE 18

| Sample Number | Sag (Mils) at Aging Time (Hours) | | | | | |
|---|---|---|---|---|---|---|
| | 4 | 24 | 168 | 336 | 504 | 672 |
| 11 | — | 110+ | 110+ | 110+ | 110+ | 110+ |
| 8 | — | 110+ | 110+ | 110+ | 110+ | 110+ |
| 5 | — | 100 | 100 | 100 | 80 | 100 |
| 3 | — | 12 | 12 | 12 | 10 | 12 |

A review of Tables 17 and 18 shows that the aged free-flowing, powdery masterbatch of the present invention when mixed with a resin, to form a resin system, results in a material whose physical properties are substantially equivalent to that of the equivalently aged control. Similar to examples 13 and 14, the masterbatch of samples of 5, 8 and 11 are preferred due to their ease of incorporation, improved incorporation time and good performance characteristics of the adhesive. As a result, the aged free-flowing, powdery masterbatch of the present invention provides substantially equivalent performance characteristics as the aged non-masterbatched metal oxides but without the materials handling problems associated with the non-masterbatched or the wet masterbatch materials.

The free-flowing, powdery masterbatch of the present invention offers desired benefits over traditional techniques of adding a metal oxide or a wet masterbatch to a resin system. The resulting masterbatch is a dry-like, free-flowing, powdery material without the dusting and handling disadvantages typically associated with metal oxides such as fumed silica. The masterbatch may be incorporated using conventional dry powder equipment and is readily and uniformly dispersed into the resin system. In addition, the resin system utilizing the masterbatch of the present invention possess good performance properties, such as stability of the resin system viscosity, reproducibility in the manufacturing process, and sag resistance.

It is further understood that the present invention is not limited to the particular embodiments shown and described herein, but that various changes and modifications may be made without departing from the scope and spirit of the invention.

What is claimed is:

1. A masterbatch comprising:
   a metal oxide having a material absorbed within the intra-aggregate void space of the metal oxide, wherein said masterbatch is free-flowing and powdery.

2. The masterbatch of claim 1, wherein said material is an organic material or a silicone.

3. The masterbatch of claim 2, wherein said organic material is an acrylic, alkyd, epoxy, formaldehyde, glycol, polyamide, polyester, polyether, polyimide, polyolefin, polyol, polysulfide, polyvinyl acetate, polyurethane, or mixtures and monomers thereof.

4. The masterbatch of claim 2, wherein said silicone is a branched, cyclic, linear, or oligomeric polyorganosiloxane.

5. The masterbatch of claim 2, wherein said silicone is a methyl, phenyl, vinyl, trifluoro, chloro polyorganosiloxanes, or a combination thereof.

6. The masterbatch of claim 2, wherein said silicone comprises alkenyl groups, halo groups, hydroxy groups, carboxy groups, cyano groups, epoxy groups, amino groups, and combinations thereof.

7. The masterbatch of claim 1, wherein said metal oxide is a silica, an alumina, a ceria, a titania, a zirconia, and mixtures thereof.

8. The masterbatch of claim 1, wherein said metal oxide is a fumed metal oxide, a precipitated metal oxide, a gel based metal oxide and mixture thereof.

9. The masterbatch of claim 8, wherein said gel based metal oxide is an aerogel, silica gel, a xerogel, or a mixture thereof.

10. The masterbatch of claim 1, wherein said metal oxide has a BET surface area of between about 40 $m^2/g$ and about 1000 $m^2/g$.

11. The masterbatch of claim 10, wherein said metal oxide has a BET surface area of between about 50 $m^2/g$ and about 400 $m^2/g$.

12. The masterbatch of claim 11, wherein said metal oxide has a BET surface area of between about 100 $m^2/g$ and about 250 $m^2/g$.

13. The masterbatch of claim 1, wherein said masterbatch is between about 5% and about 99%, by weight, metal oxide.

14. The masterbatch of claim 13, wherein said masterbatch is between about 25% and about 80%, by weight, metal oxide.

15. The masterbatch of claim 14, wherein said masterbatch is between about 30% and about 75%, by weight, metal oxide.

16. The masterbatch of claim 1, wherein said metal oxide is a hydrophilic metal oxide.

17. The masterbatch of claim 1, wherein said metal oxide is a hydrophobic metal oxide.

18. The masterbatch of claim 8, wherein said fumed metal oxide is a fumed silica.

19. The masterbatch of claim 18, wherein said fumed silica has a BET surface area of between about 50 $m^2/g$ and about 400 $m^2/g$.

20. The masterbatch of claim 19, wherein said fumed silica has a BET surface area of between about 100 $m^2/g$ and about 250 $m^2/g$.

21. The masterbatch of claim 18, wherein said fumed silica is a hydrophobic fumed silica.

22. The masterbatch of claim 21, wherein said hydrophobic fumed silica is a polydimethylsiloxane treated hydrophobic fumed silica.

23. The masterbatch of claim 1, wherein said metal oxide is a polydimethylsiloxane treated fumed silica and said material is an epoxy resin.

24. The masterbatch of claim 23, wherein said polydimethylsiloxane treated fumed silica has a surface area of between about 50 $m^2/g$ and about 400 $m^2/g$.

25. The masterbatch of claim 24, wherein said polydimethylsiloxane treated fumed silica has a surface area of between about 80 $m^2/g$ and about 250 $m^2/g$.

26. The masterbatch of claim 23, wherein said masterbatch is between about 30% and about 50%, by weight, polydimethylsiloxane treated fumed silica.

* * * * *